(12) United States Patent
Clanton

(10) Patent No.: US 12,290,075 B1
(45) Date of Patent: May 6, 2025

(54) GAME ATTRACTANT AND VARMINT REPELLENT COMPOSITIONS AND METHODS

(71) Applicant: DC Unlimited LLC, DeRidder, LA (US)

(72) Inventor: Duncan Clanton, DeRidder, LA (US)

( * ) Notice: Subject to any disclaimer, the term of this patent is extended or adjusted under 35 U.S.C. 154(b) by 0 days.

(21) Appl. No.: 18/926,515

(22) Filed: Oct. 25, 2024

(51) Int. Cl.
| | |
|---|---|
| *A61K 36/00* | (2006.01) |
| *A01N 25/08* | (2006.01) |
| *A01N 65/08* | (2009.01) |
| *A01N 65/38* | (2009.01) |
| *A01P 17/00* | (2006.01) |
| *A01P 19/00* | (2006.01) |

(52) U.S. Cl.
CPC ............. *A01N 65/38* (2013.01); *A01N 25/08* (2013.01); *A01N 65/08* (2013.01); *A01P 17/00* (2021.08); *A01P 19/00* (2021.08)

(58) Field of Classification Search
CPC .................................. A01P 17/00; A01P 19/00
See application file for complete search history.

(56) References Cited

U.S. PATENT DOCUMENTS

| | | |
|---|---|---|
| 4,440,783 A | 4/1984 | Downing |
| 5,466,459 A | 11/1995 | Wilson |
| 6,159,474 A | 12/2000 | Davidson |
| 6,923,977 B1 | 8/2005 | Boyce |
| 9,526,253 B2 | 12/2016 | Anderson |
| 2006/0070579 A1 | 4/2006 | Hackley |
| 2013/0004600 A1 | 1/2013 | Davidson |
| 2014/0212377 A1 | 7/2014 | Harden |
| 2017/0099843 A1 | 4/2017 | Kerk |
| 2022/0142119 A1 | 5/2022 | Coffey |

FOREIGN PATENT DOCUMENTS

| | | | |
|---|---|---|---|
| CN | 102669755 A | * | 9/2012 |
| CN | 112089022 A | * | 12/2020 |

\* cited by examiner

*Primary Examiner* — Qiuwen Mi
(74) *Attorney, Agent, or Firm* — R. Keith Harrison

(57) ABSTRACT

Game attractant and varmint repellent compositions which can be applied to a wildlife feeder to attract game animals to the feeder via positive aromatic characteristics and simultaneously deter or repel feed scavenging varmint animals from the feeder via negative gustatory characteristics may include a composition mixture comprising at least one carrier in a quantity of from about 55% to about 95% by weight; at least one pepper in a quantity of from about 0.5% to about 25% by weight; at least one oil in a quantity of from about 2% to about 25% by weight; and at least one spice in a quantity of from about 2% to about 20% by weight. Game attractant and varmint repelling methods are also disclosed.

20 Claims, 8 Drawing Sheets

GAME ATTRACTANT AND VARMINT REPELLENT COMPOSITIONS AND METHODS

FIELD

Illustrative embodiments of the disclosure generally relate to compositions and methods for attracting game animals to wildlife feeders and repelling feed scavenging animals and other varmints from the feeders. More particularly, illustrative embodiments of the disclosure relate to game attractant and varmint repellent compositions and methods which can be applied to a wildlife feeder to attract game animals to the feeder via positive aromatic characteristics and simultaneously repel and deter feed scavenging animals from the feeder via negative gustatory characteristics.

SUMMARY

Illustrative embodiments of the disclosure are generally directed to game attractant and varmint repellent compositions which can be applied to a wildlife feeder to attract game animals to the feeder via positive aromatic characteristics and simultaneously deter or repel feed scavenging animals from the feeder via negative gustatory characteristics. An illustrative embodiment of the compositions may comprise, consist essentially of, or consist of a composition mixture comprising, consisting essentially of, or consisting of at least one carrier in a quantity of from about 55% to about 95% by weight; at least one pepper in a quantity of from about 0.5% to about 25% by weight; at least one oil in a quantity of from about 2.0% to about 25% by weight; and at least one spice in a quantity of from about 2% to about 20% by weight.

In another aspect, the carrier may include jelly or butter.

In another aspect, the jelly may include petroleum jelly.

In another aspect, the butter may include shea butter, cocoa butter, mango butter, or any combination thereof.

In another aspect, the pepper may include cayenne pepper, black pepper, paprika, red pepper, tabasco pepper, serrano pepper, Thai pepper, jalapeno pepper, guajillo pepper, habanero pepper, or any combination thereof.

In another aspect, the oil may include oil derived from petroleum, olive oil, sunflower oil, coconut oil, canola oil, rice bran oil, sesame oil, vegetable oil, avocado oil, or any combination thereof.

In another aspect, the spice may include cinnamon, cinnamon extract, ginger, nutmeg, hazelnut, walnut, pecan, acorn, apple pie spice, allspice, cloves, pumpkin pie spice, cardamom, mace, star anise, cassia, or any combination thereof.

In another aspect, the composition mixture may include deer urine.

In another aspect, the game attractant and varmint repellent composition may comprise, consist essentially of, or consist of a composition mixture comprising, consisting essentially of, or consisting of at least one carrier in a quantity of from about 60% to about 90% by weight; at least one pepper in a quantity of from about 1.0% to about 20% by weight; at least one oil in a quantity of from about 5% to about 20% by weight; and at least one spice in a quantity of from about 5% to about 15% by weight.

In another aspect, the game attractant and varmint repellent composition may comprise, consist essentially of, or consist of a composition mixture comprising, consisting essentially of, or consisting of a carrier comprising petroleum jelly in a quantity of from about 45% to about 85% by weight and paraffin wax in a quantity of from about 5% to about 25% by weight; cayenne pepper in a quantity of from about 0.5% to about 25% by weight; olive oil in a quantity of from about 2% to about 25% by weight; cinnamon in a quantity of from about 1% to about 15% by weight; and nutmeg in a quantity of from about 0.5% to about 5% by weight.

Illustrative embodiments of the disclosure are further generally directed to methods of attracting game to and repelling varmint animals from an object or area. An illustrative embodiment of the methods may include obtaining a composition mixture comprising, consisting essentially of or consisting of at least one carrier in a quantity of from about 55% to about 95% by weight, at least one pepper in a quantity of from about 0.5% to about 25% by weight, at least one oil in a quantity of from about 2% to about 25% by weight, and at least one spice in a quantity of from about 2% to about 20% by weight; and applying the composition mixture to the object or area.

In another aspect, obtaining the composition mixture may include obtaining a roll-on composition dispenser having a dispenser base and a composition stick selectively extendable from the dispenser base, and applying the composition mixture to the object or area may include applying the composition stick against the object or area.

In another aspect, obtaining the composition mixture may include obtaining a composition container and a composition gel selectively removable from the composition container, and applying the composition mixture to the object or area may include removing the composition gel from the composition container and applying the composition gel on the object or area.

In another aspect, obtaining the composition mixture may include obtaining a composition tube and a composition gel selectively forcibly dischargeable from the composition tube, and applying the composition mixture to the object or area may include forcibly discharging the composition gel from the composition tube onto the object or area.

These and other objects, features, and advantages of the present disclosure will become more readily apparent from the attached drawings and the detailed description of various illustrative embodiments, which follow.

BRIEF DESCRIPTION OF THE DRAWINGS

Illustrative embodiments of the disclosure will now be described, by way of example, with reference to the accompanying drawings, in which.

Like reference numerals refer to like parts throughout the several views of the drawings.

DETAILED DESCRIPTION

Figure 1:
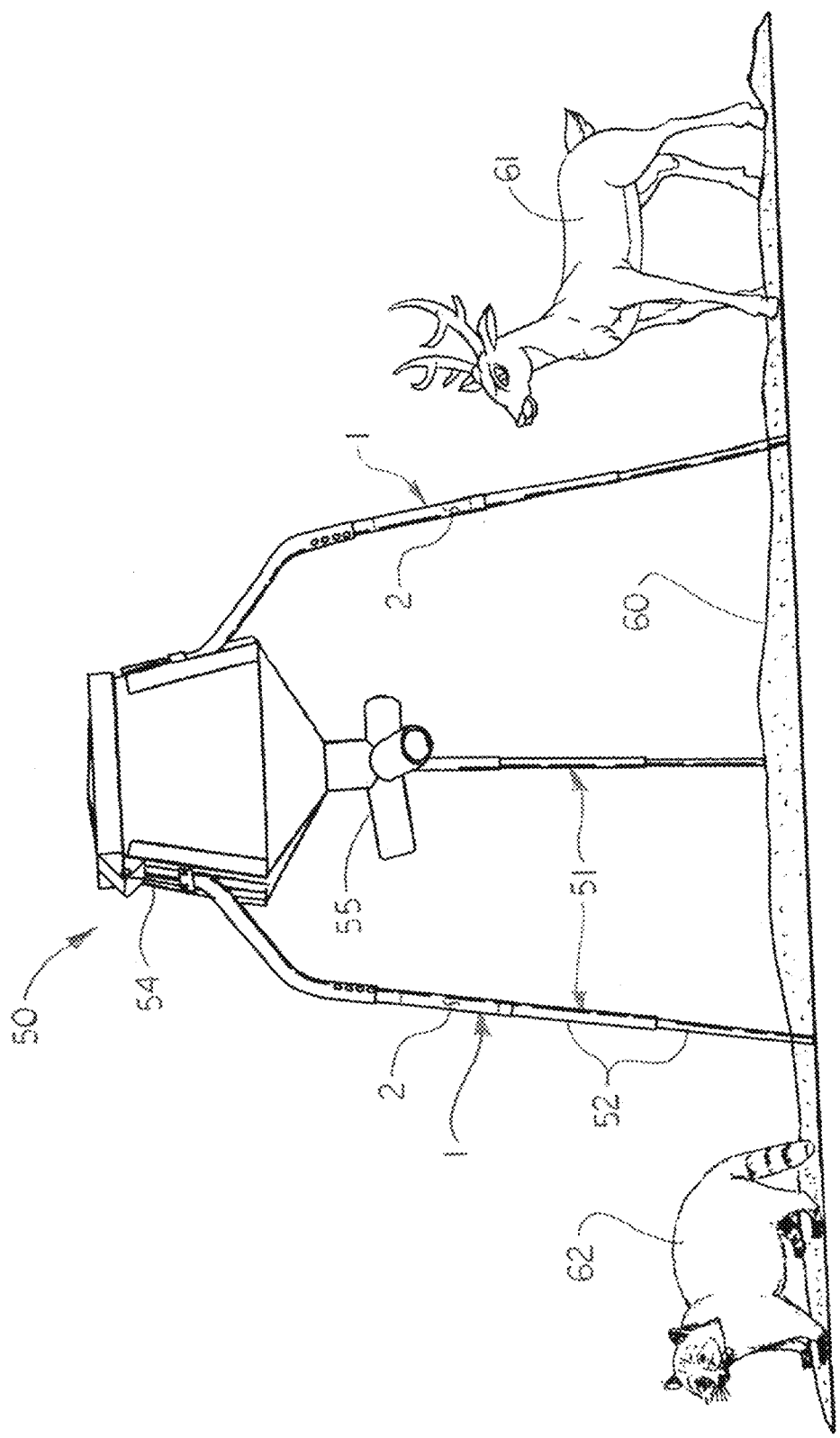
FIG. 1 is a front view of a typical wildlife feeder with an illustrative embodiment of the game attractant and varmint repellant compositions applied to feeder legs of the feeder to attract game animals to and repel feed scavenging animals from the feeder.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the subject matter as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

All methods set forth in the present disclosure may be performed in any suitable order of steps unless otherwise indicated herein or contradicted by the rules of logic. The use of any and all examples or exemplary language provided herein is intended to clearly describe the subject matter of the disclosure and is not intended to be limiting on the scope of the subject matter set forth in the claims. No element, step, ingredient, or limitation mentioned or described in the specification shall not be construed as regarding any unclaimed component, step, or limitation to be essential in practicing the claimed subject matter.

Unless expressly or implicitly indicated otherwise, throughout the description and the appended claims, the terms "comprise", "comprising", "comprised of" and the like are to be construed in an inclusive sense as opposed to an exclusive or exhaustive sense, and are equivalent to the phrase, "including but not limited to". Each embodiment disclosed herein can comprise, consist essentially of, or consist of its particular stated element, step, ingredient, or limitation. As used herein, the transition terms "comprise", "comprises", "comprising", "include", "includes", "including", "is", "has", "having" or the like means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment. Throughout the written description, drawings and claims appended hereto, unless otherwise noted, it shall be recognized and understood that each embodiment of the described, illustrated and claimed subject matter may comprise, consist essentially of, or consist of any component, element or combination of components or elements set forth herein.

Unless otherwise noted using precise or limiting terminology, all numbers which express quantities of ingredients throughout the specification and claims are to be understood as being approximations of the numerical value cited to express the quantities of those ingredients. As used throughout the specification and claims, the term "about" has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 20% of the stated value or range in either direction.

Various illustrative embodiments of the disclosure are described herein. Variations on the described illustrative embodiments may become apparent to those of ordinary skill in the art in reading the specification, drawings and claims of the disclosure. Accordingly, the disclosure encompassed by the specification, claims and drawings includes all modifications and equivalents of the subject matter recited in the claims as permitted by applicable law. Additionally, any combination of the elements in all possible variations thereof is encompassed by the subject matter of the disclosure unless otherwise indicated herein.

The term "or combinations thereof as used herein refers to all permutations and combinations of the listed items preceding the term. For example, "A, B, C, or combinations thereof is intended to include at least one of A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Figure 4:
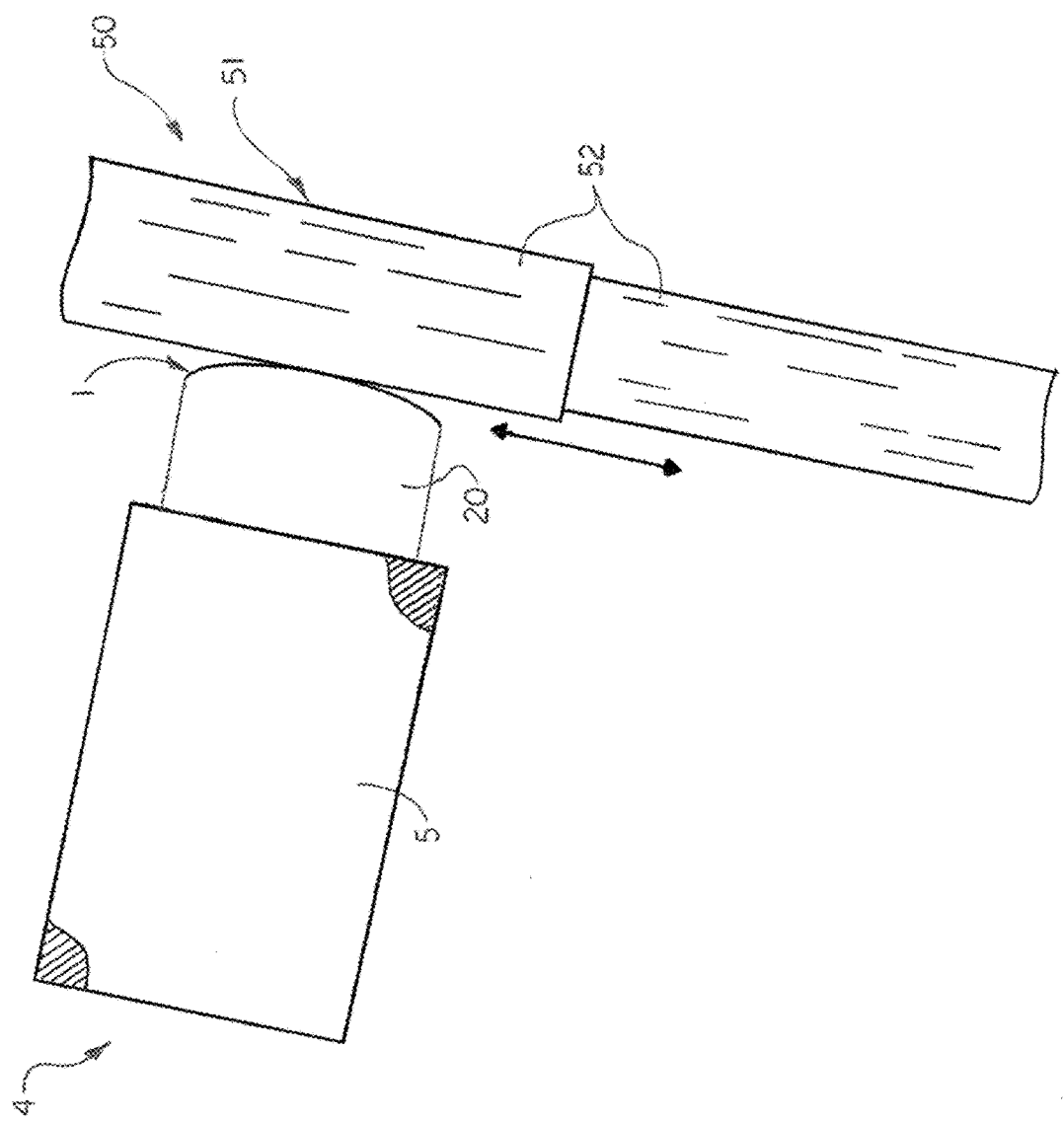
FIG. 4 is a front view of the roll-on composition dispenser in typical application of the composition from the composition stick onto a feeder leg (partially in section) of the feeder.
Figure 5:
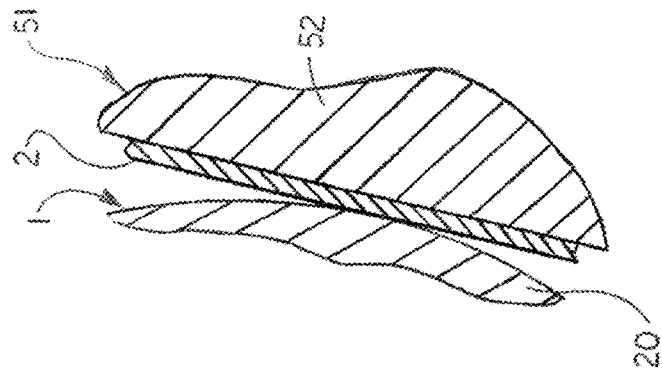
FIG. 5 is an enlarged sectional view illustrating typical application of a composition layer of the composition onto the feeder leg from the composition stick.
Figure 7:
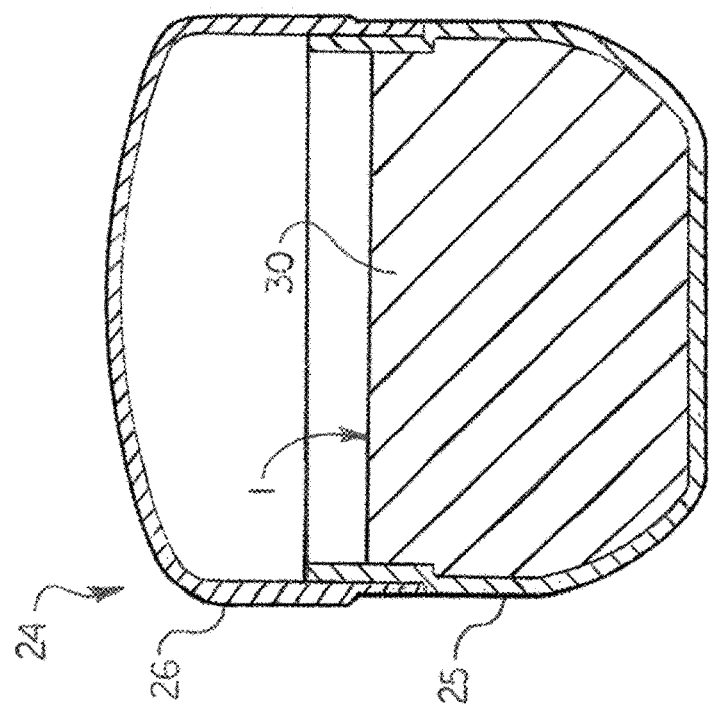
FIG. 7 is a longitudinal sectional view of the composition container illustrated in FIG. 6.
Figure 6:
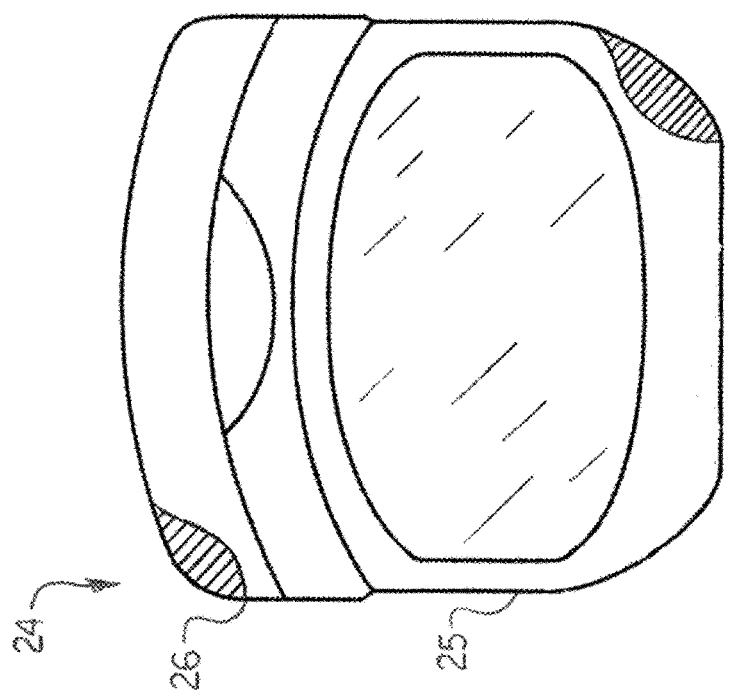
FIG. 6 is a front view of an illustrative composition container suitable for containing the game attracting and varmint repelling composition in the form of a composition gel for application onto the wildlife feeder.
Figure 9:
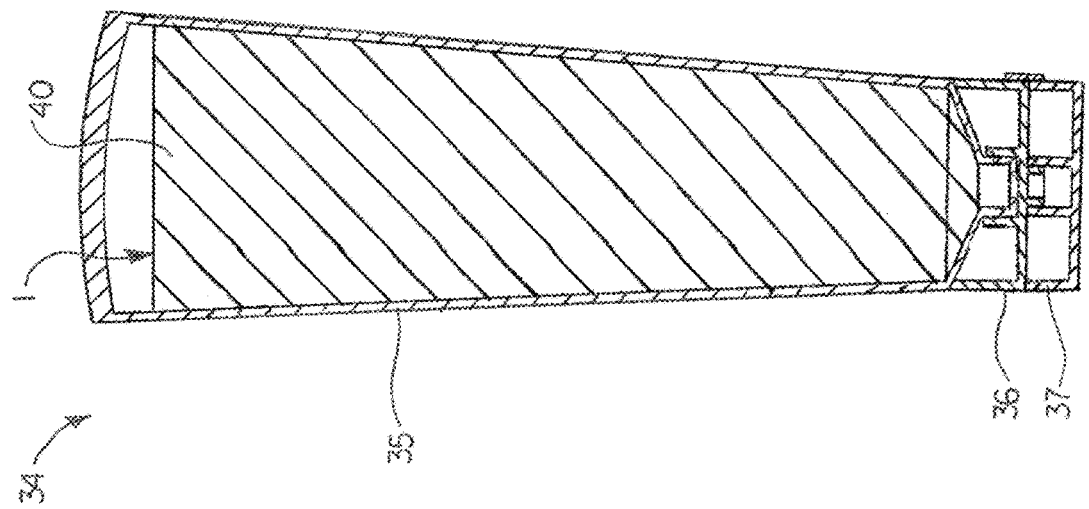
FIG. 9 is a longitudinal sectional view of the composition tube illustrated in FIG. 8.
Figure 8:
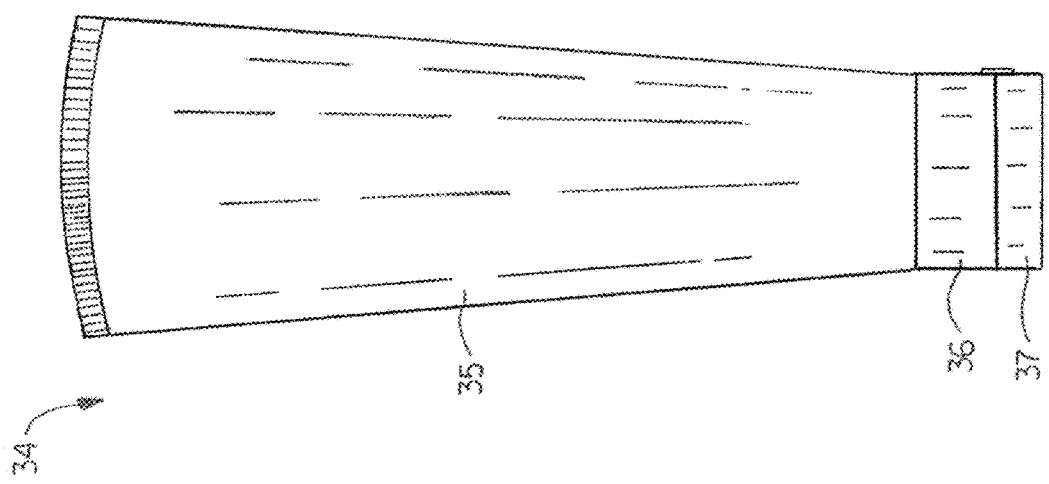
FIG. 8 is a front view of an illustrative composition dispensing tube suitable for dispensing the game attracting and varmint repelling composition in the form of a composition gel onto the wildlife feeder.

Referring initially to FIGS. 1-9 of the drawings, illustrative embodiments of the disclosure are generally directed to game attractant and varmint repellant compositions, hereinafter composition 1. As illustrated in FIG. 1 and will be hereinafter described, in typical application, the composition 1 can be selectively applied to a wildlife feeder 50 to attract game animals and/or other animals of interest, hereinafter game animals 61, to the feeder 50 via positive aromatic characteristics and simultaneously deter or repel feed scavenging and/or other varmint animals, hereinafter varmint animals 62, from the feeder 50 via negative gustatory characteristics. The composition 1 may be applied to the wildlife feeder 50, or to any other selected object or area to which the game animals 61 are to be attracted typically for hunting, observation and/or other purposes and from which the varmint animals 62 are to be repelled, as one or more composition layers 2. As illustrated in FIGS. 2-5, in some embodiments, the composition 1 may be formulated as a composition stick 20 for application to the object or area from a roll-on composition dispenser 4. As illustrated in FIGS. 6 and 7, in some embodiments, the composition 1 may be formulated as a composition gel 30 and stored in a composition container 24 for application to the object or area. As illustrated in FIGS. 8 and 9, in some embodiments, the composition 1 may be formulated as a composition gel 40 for application to the object or area from a composition dispensing tube 34.

In some embodiments, the composition 1 may comprise, consist essentially of, or consist of a composition mixture which comprises, consists essentially of, or consists of selected quantities of at least one carrier, at least one pepper, at least one oil and at least one spice. The composition 1 may combine the positive aromatic characteristics of the spice or spices with the negative gustatory characteristics of the pepper or peppers in a unitary composition mixture which can be applied to a wildlife feeder or other object or area in a single use or application for the purpose of attracting game animals or other animals of interest to and repelling and deterring feed scavenging and/or other varmint animals from the object or area.

In some embodiments, the composition 1 may comprise, consist essentially of, or consist of a composition mixture which comprises, consists essentially of, or consists of at least one carrier in a quantity of from about 55% to about 95%, and preferably, from about 65% to about 90%, by weight; at least one pepper in a quantity of from about 0.5% to about 25%, and preferably, from about 1% to about 20%, by weight; at least one oil in a quantity of from about 2% to about 25%, and preferably, from about 10% to about 15%, by weight; and at least one spice in a quantity of from about 2% to about 20%, and preferably, from about 5% to about 15%, by weight.

In some embodiments, the composition 1 may comprise, consist essentially of, or consist of a composition mixture which comprises, consists essentially of, or consists of a carrier comprising, consisting essentially of or consisting of at least one jelly in a quantity of from about 45% to about 85% by weight and at least one wax in a quantity of from about 5% to about 25% by weight; at least one pepper in a quantity of from about 0.5% to about 25% by weight; at least one oil in a quantity of from about 2% to about 25% by weight; a first spice in a quantity of from about 1% to about 15% by weight; and a second spice in a quantity of from about 0.5% to about 5% by weight. In some embodiments, the jelly of the carrier may comprise, consist essentially of, or consist of petroleum jelly. The wax may comprise, consist essentially of, or consist of paraffin wax. The first spice may comprise, consist essentially of, or consist of cinnamon. The second spice may comprise, consist essentially of, or consist of nutmeg.

In some embodiments, the composition mixture of the composition 1 may include at least one additional attractant such as deer urine and/or one or more bedding area smells, for example and without limitation. In some embodiments, the additional attractant may be present in the composition mixture in quantities of from about 1% by weight to about 50% by weight.

As used herein, "carrier" may include but is not limited to any natural and/or manmade polymeric substance, compound or preparation which has a solid or semisolid consistency at room temperature, is capable of supporting the various components of the composition 1 and is applicable to and spreadable on a surface manually or by using an applicator. For example and without limitation, in some embodiments, the carrier in the composition mixture of the composition 1 may comprise, consist essentially of, or consist of at least one jelly, at least one butter, at least one wax, or any combination thereof. As used herein, the term "jelly", "jellies" and the like may include but are not limited to any preparation having a soft, elastic consistency due to the presence of gelatin, pectin, hydrocarbons, and/or other polymers. Jellies which are suitable for the purpose may include but are not limited to petroleum jelly.

As used herein, the term "butter", "butters" and the like may include but are not limited to "a solid emulsion of fat globules, air, and water" or "any of various fatty oils remaining nearly solid at ordinary temperatures". Butters which may be suitable for the purpose include but are not limited to shea butter, cocoa butter, mango butter, or any combination thereof.

As used herein, "wax", "waxes" and the like may include but are not limited to "a solid, fatty substance that is a solid at room temperature and softens and melts at a low temperature above room temperature". Waxes which may be suitable for the purpose include but are not limited to animal wax (waxes derived from secretions of animals and insects such as tallow, ambergris, beeswax, and lanolin) and plant wax (waxes derived from plants such as Candelilla wax, carnauba wax, soy wax, and cottonseed wax), crude wax, microcrystalline wax, palm wax, paraffin wax, petrolatum, petroleum wax, rapeseed wax, slack wax, and synthetic wax (wax fabricated from natural gas or ethylene), or any combination thereof.

As used herein, the term "pepper", "peppers" and the like may include but are not limited to any product which naturally possesses or can be modified to possess a spicy, hot taste to mammals. These products may include but are not limited to substances produced from members of the genus *Piper*, which contain piperine (a chemical associated with a biting sensation), as well as substances produced from members of the genus *Capsicum*, which taste hot due to the presence of the chemical capsaicin. Peppers which are suitable for the composition mixture may include but are not limited to cayenne pepper, black pepper, paprika, red pepper, tabasco pepper, serrano pepper, Thai pepper, jalapeno pepper, guajillo pepper, habanero pepper, or any combination thereof.

As used herein, the term "oil", "oils" and the like may include but are not limited to any of a large class of substances typically unctuous, viscous, combustible, liquid at ordinary temperatures, and soluble in ether or alcohol but not in water, Oils which are suitable for the composition may include but are not limited to oils derived from petroleum, olive oil, sunflower oil, coconut oil, canola oil, rice bran oil, sesame oil, vegetable oil, avocado oil, or any combination thereof.

As used herein, the term "spice", "spices" and the like may include but are not limited to any aromatic substance used to flavor food and/or impart a pleasing aromatic quality to air (e.g., air fresheners). Spices which are suitable for the composition may include but are not limited to cinnamon, cinnamon extract, ginger, nutmeg, hazelnut, walnut, pecan, acorn, apple pie spice, allspice, cloves, pumpkin pie spice, cardamom, mace, star anise, cassia, or any combination thereof.

In some applications, the composition layer or layers 2 may include a sufficient quantity of the composition 1 to cover a sufficient area for attraction of the game animal or animals 61 to the wildlife feeder 50 and repellant of the varmint animal 62 from the wildlife feeder 50. A typical batch having quantities of the composition 1 which are sufficient to facilitate application of the composition layer or layers 2 to the wildlife feeder 50 for the purpose may include a carrier having from about 50 grams or 2 ounces to about 65 grams or 2.25 ounces of petroleum jelly and from about 6 grams or 0.5 ounces to about 14 grams or 0.25 ounces of paraffin wax; cayenne pepper in quantities of from about 1 gram (1 teaspoon) to about 15 grams (2 tablespoons); olive oil in quantities of from about 4 grams (1 teaspoon) to about 15 grams (1 tablespoon); cinnamon in quantities of from about 2 grams (1 teaspoon) to about 10 grams (2 tablespoons); and nutmeg in quantities of from about 1 gram (0.5 teaspoon) to about 3 grams (1 teaspoon).

Figure 3:
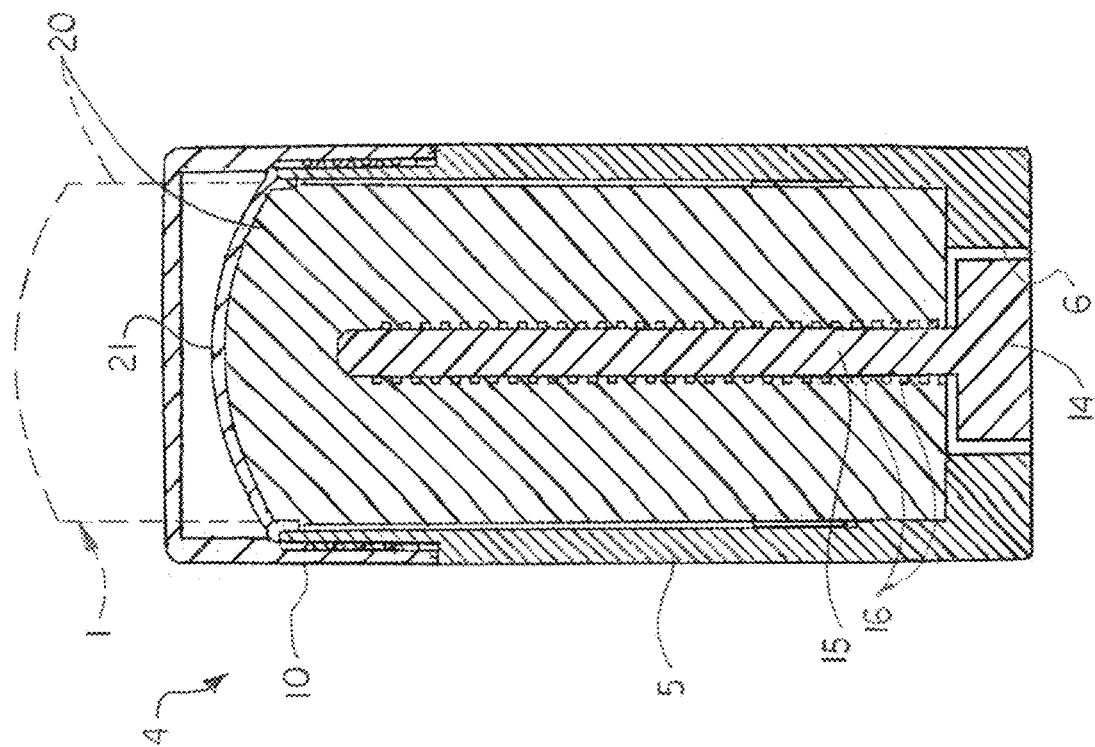
FIG. 3 is a longitudinal sectional view of the roll-on composition dispenser illustrated in FIG. 2.
Figure 2:
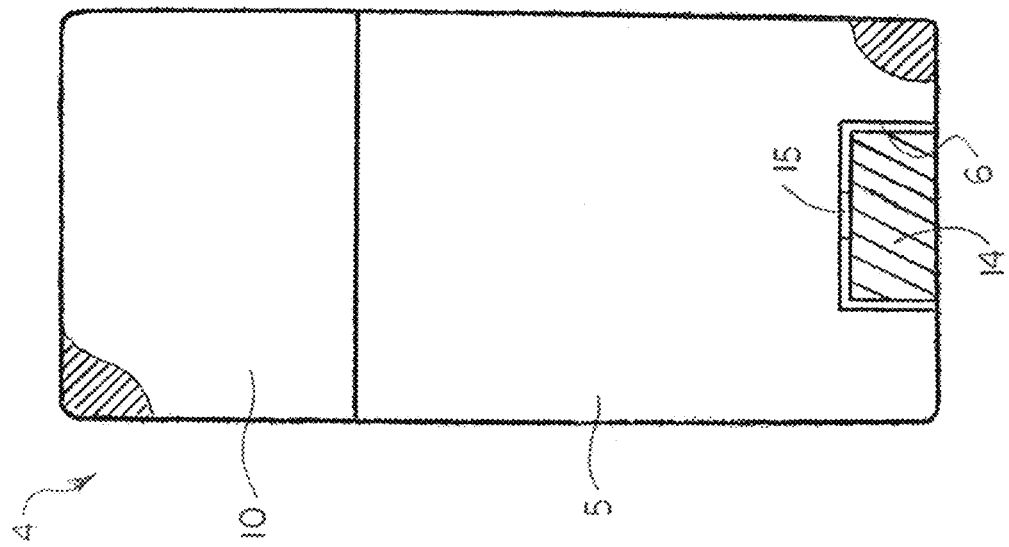
FIG. 2 is a front view of an illustrative roll-on composition dispenser suitable for applying the game attractant and varmint repellant composition from a composition stick onto the wildlife feeder.

As illustrated in FIGS. 2 and 3, in some embodiments, the composition 1 may be formulated as the composition stick 20 for application to the wildlife feeder 50 using the roll-on composition dispenser 4. Accordingly, the composition stick 20 may be fabricated by initially placing the respective quantities of the jelly and wax of the carrier, the pepper(s), the oil(s) and the spice(s) in a suitable mixing container. A homogenous composition mixture may be obtained by thoroughly mixing the carrier components, the pepper(s), the oil(s) and the spice(s). The composition stick 20 may be formed and shaped using standard or conventional forming and shaping equipment suitable for the purpose. The consistency of the composition stick 20 may be adjusted and selected typically by selecting the proportions or ratios between the jelly and the wax in the carrier.

In typical packaging of the composition stick 20, the roll-on composition dispenser 4 may include a dispenser base 5 having a dial cavity 6 and a removable dispenser cap 10. As illustrated in FIG. 3, a stick advancing shaft 15 may have shaft threads 16 which threadedly engage the composition stick 20 for selective advancement and retraction of the composition stick 20 by rotation of the stick advancing shaft 15. A shaft rotation dial 14 may engage the stick advancing shaft 15 for rotation thereof. The shaft rotation dial 14 may be disposed in the dial cavity 6 in the dispenser base 5. By rotation of the shaft rotation dial 14 in first and second rotational directions, the composition advancing shaft 15 may advance and retract, respectively, the composition stick 20 with respect to the dispenser base 5. In some embodiments, a composition stick cover 21 may be deployed in place on the composition stick 20 in the retracted position of the composition stick 20 or prior to the first use of the composition stick 20. In some applications, the composition stick 20 may be packaged using alternative packaging techniques typically known by those skilled in the art.

As illustrated in FIGS. 6 and 7, in some embodiments, the composition 1 may be formulated as the composition gel 30 and packaged in the composition container 24 for ultimate application to the wildlife feeder 50 manually or by using a rag, swab, brush or other suitable applicator (not illustrated). The composition gel 30 may be formed as was described above with respect to fabrication of the composition stick 20, with the ratios between the jelly and the wax in the carrier typically adjusted to achieve the desired gel consistency.

The composition container 24 may include a container base 25. A container lid 26 may be detachably or pivotally attached to the container base 25. In packaging of the composition 1, a sufficient quantity of the composition gel 30 may be placed in the container base 25 and the container lid 26 closed thereon to maintain the moisture and freshness of the composition gel 30 until use.

As illustrated in FIGS. 8 and 9, in some embodiments, the composition 1 may be formulated as the composition gel 40 and packaged in the composition dispensing tube 34 for ultimate application to the wildlife feeder 50 typically by manual squeezing of the composition dispensing tube 34. The composition gel 40 may be formed as was described above with respect to fabrication of the composition stick 20 and the composition gel 30, with the ratios between the jelly and the wax in the carrier typically adjusted to achieve the desired gel consistency.

The composition dispensing tube 34 may include a flexible, squeezable tube body 35. A tube cap 36 may be detachably or pivotally attached to the tube body 35. The tube cap 36 may include an openable and closable tube cap lid 37. In packaging of the composition 1, a sufficient quantity of the composition gel 40 may be placed in the tube body 35 and the tube cap 36 closed thereon to maintain the moisture and freshness of the composition gel 40 until use.

As illustrated in FIG. 1, in typical application, the composition 1 may be applied typically as one or more of the composition layers 2 on the wildlife feeder 50 to simultaneously attract deer and/or other game animals 61 to the feeder 50 and repel raccoons and/or other feed-scavenging varmint animals 62 from the feeder 50. Accordingly, the wildlife feeder 50 may have a standard or conventional design with multiple feeder legs 51 each typically having telescoping feeder leg segments 52. A feed receptacle 54, fitted with a feed dispenser 55, may be supported by the feeder legs 51. The feeder legs 51 may be erected on the ground 60 and the feed receptacle 54 deployed in place thereon. A supply of particulate animal feed (not illustrated) may be placed in the feed receptacle 54. In some applications, the feed dispenser 55 may include a timer-controlled dispensing mechanism (not illustrated) typically known by those skilled in the art. The timer-controlled dispensing mechanism may be configured to periodically dispense the animal feed from the feed receptacle 54 through the feed dispenser 55 onto the ground 60 at timed intervals, typically in the conventional manner.

As illustrated in FIGS. 4 and 5, in some applications of the composition 1, the roll-on composition dispenser 4 may be used to apply one or more composition layers 2 on one or more of the feeder legs 51 of the wildlife feeder 50. In some embodiments, each feeder leg 51 of the wildlife feeder 50 may include telescoping feeder leg segments 52. The composition layer or layers 2 may be applied to one or more feeder leg segments 52 on each feeder leg 51 of the wildlife feeder 50. Accordingly, the dispenser cap 10 (FIGS. 2 and 3) may initially be removed from the dispenser base 5 of the roll-on composition dispenser 4 and the composition stick cover 21 typically removed from the composition stick 20. The composition stick 20 may be advanced from the dispenser base 5, as indicated by the phantom lines in FIG. 3, typically by rotation of the shaft rotation dial 14 in the stick advancing direction. As illustrated in FIG. 4, the extended composition stick 20 may be applied and rubbed against one or more of the feeder legs 51 of the wildlife feeder 50 to form the composition layer or layers 2 on the feeder leg 51, as illustrated in FIG. 5. In some applications, the composition stick 20 may be applied against two or more of the feeder leg segments 52 of each feeder leg 51 for adequate coverage. The aroma of the spice or spices in the composition 1 may impart positive aromatic characteristics which serve as an attractant for game animals 61 such as deer to approach the wildlife feeder 50 typically for hunting, observation or other purposes, whereas the negative taste of the pepper or peppers in the composition 1 may impart negative gustatory characteristics which repel and deter feed scavenging varmint animals 62 such as raccoons from attempting to climb the feeder legs 51 of the wildlife feeder 50 to access the feed in the feed receptacle 54 and/or the feed dispenser 55. The composition 1 may thus both reduce the coefficient of friction of the feeder legs 51 (i.e., render the feeder legs 51 more slippery) as well as impart the negative gustatory characteristics which serve as a powerful deterrent from the varmint animals 62 in successfully climbing the feeder legs 51 to access the feed in the feed receptacle 54 and/or the feed dispenser 55. The composition layers 2 may be selectively removed from the feeder 50, as desired, typically by wiping the composition layer 1 using a rag or the like.

As illustrated in FIGS. 6 and 7, in some applications of the composition 1, the composition gel 30 may be accessed from the container base 25 of the composition container 24 typically by opening the container lid 26 on the container base 25. The composition gel 30 may be removed from the container base 25 manually or by using a rag, swab, brush or other suitable applicator (not illustrated). The applicator may be used to apply one or more composition layers 2 of the composition 1 typically on the feeder legs 51 of the wildlife feeder 50. The spice in the applied composition layer or layers 2 of the composition 1 may impart positive aromatic characteristics to the composition 1 and attract the game animals 61 to the wildlife feeder 50 by smell, whereas the pepper may impart negative gustatory characteristics to the composition 1 and repel and deter the varmint animals 62 from attempting to access the feed in the feed receptacle 54 and/or the feed dispenser 55 by climbing the feeder legs 51, as was heretofore described. The composition layers 2 may be selectively removed from the feeder 50, as desired, typically by wiping the composition layer 1 using a rag or the like.

As illustrated in FIGS. 8 and 9, in some applications of the composition 1, the composition gel 40 may be forcibly expelled from the tube body 35 of the composition dispensing tube 34 typically by initially opening the tube cap lid 37 on the tube cap 36. A selected quantity of the composition gel 40 may be forcibly expelled from the tube body 35 through the tube cap 36, typically by manually squeezing the tube body 35, to apply one or more composition layers 2 of the composition 1 typically on the feeder legs 51 of the wildlife feeder 50. The spice in the applied composition layer or layers 2 of the composition 1 may attract the game animals 61 to the wildlife feeder 50 by smell whereas the negative taste of the pepper in the composition 1 may repel and deter the varmint animals 62 from attempting to access the feed in the feed receptacle 54 and/or the feed dispenser 55 by climbing the feeder legs 51, as was heretofore described. The composition layers 2 may be selectively removed from the feeder 50, as desired, typically by wiping the composition layer 1 using a rag or the like.

Figure 10:
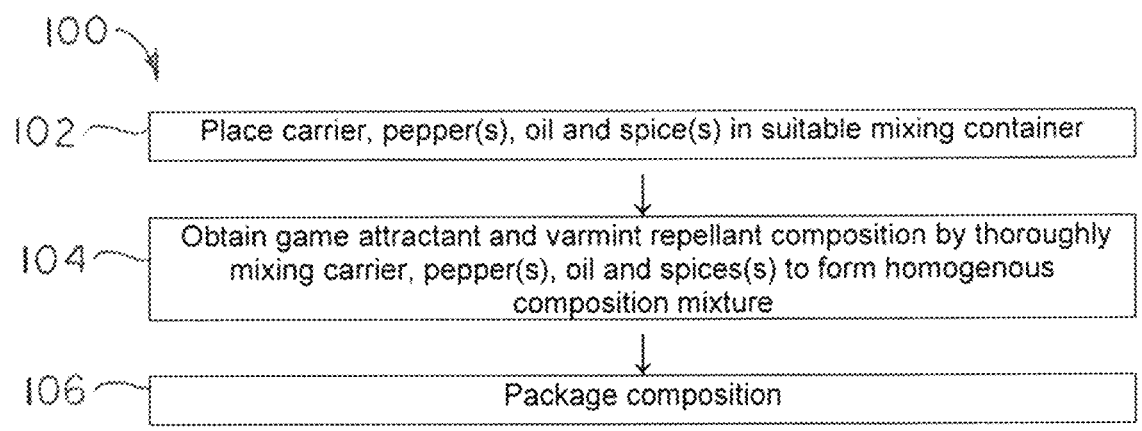
FIG. 10 is a flow diagram of an illustrative method of fabricating and packaging the game attractant and varmint repellant compositions.

Referring next to FIG. 10 of the drawings, a flow diagram of an illustrative method of fabricating and packaging the game attractant and varmint repellant compositions is generally indicated by reference number 100. At Step 102, at least one carrier, at least one pepper, at least one oil and at least one spice may be placed in a suitable mixing container.

At Step 104, a game attractant and varmint repellant composition may be obtained by thoroughly mixing the carrier, the pepper, the oil and the spice to form a homogenous composition mixture.

At Step 106, the composition prepared at Step 104 may be packaged. In some embodiments, the composition may be formulated as a composition stick and packaged in a roll-on composition dispenser. In some embodiments, the composition may be formulated as a composition gel and packaged in a composition container. In some embodiments, the composition may be formulated as a composition gel and packaged in a composition dispensing tube.

Figure 11:
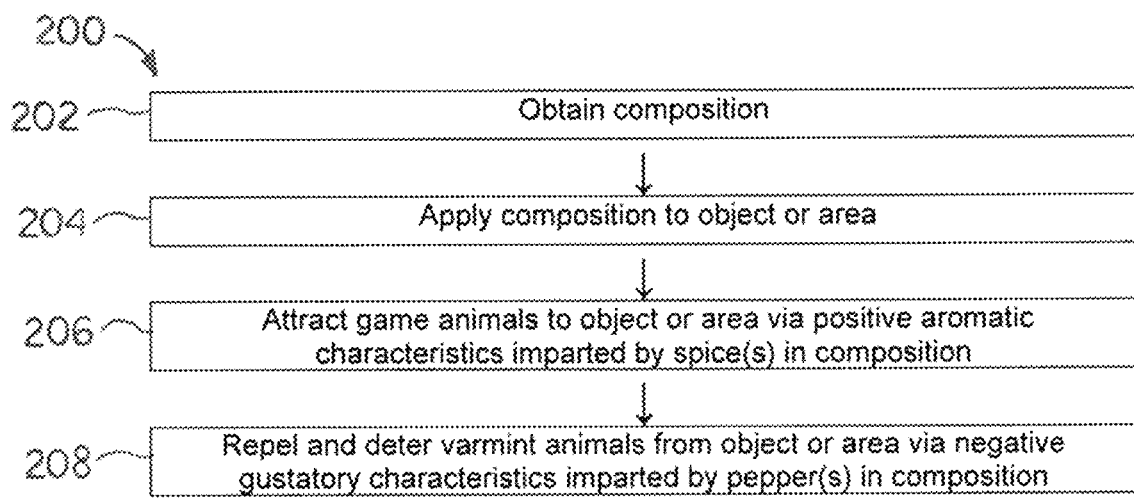
FIG. 11 is a flow diagram of an illustrative embodiment of the game attractant and varmint repellant methods.

Referring next to FIG. 11 of the drawings, a flow diagram of an illustrative embodiment of the game attractant and varmint repellant methods is generally indicated by reference number 200. At Step 202, a game attractant and varmint repellant composition may be obtained. The composition may be prepared and packaged as set forth above in FIG. 10.

At Step 204, the composition may be applied to an object or area. In some applications, the composition may be applied in one or more composition layers on or at the object or area.

At Step 206, game animals may be attracted to the object or area via positive aromatic characteristics imparted by the spice(s) in the composition.

At Step 208, varmint animals may be repelled and deterred from the object or area via negative gustatory characteristics imparted by the pepper(s) in the composition.

Figure 12:
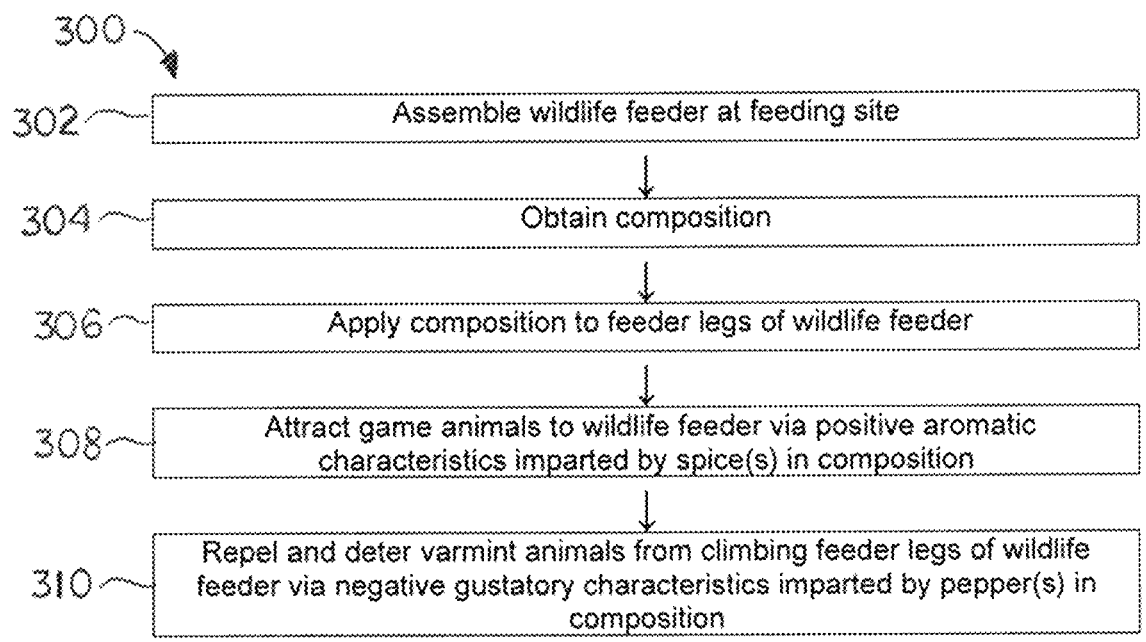
FIG. 12 is a flow diagram of an illustrative embodiment of the game attractant and varmint repellant methods as applied to a wildlife feeder.

Referring next to FIG. 12 of the drawings, a flow diagram of an illustrative embodiment of the game attractant and varmint repellant methods as applied to a wildlife feeder having feeder legs is generally indicated by reference number 300. At Step 302, the wildlife feeder may be assembled at a feeding site.

At Step 304, a game attractant and varmint repellant composition may be obtained. The composition may be prepared and packaged as set forth above in FIG. 10.

At Step 306, the composition may be applied to the feeder legs of the wildlife feeder. In some embodiments, the composition may be applied to the feeder legs from a composition stick using a roll-on composition dispenser. In some embodiments, the composition may be applied to the feeder legs as a composition gel obtained from a composition container using a suitable applicator. In some embodiments, the composition may be applied to the feeder legs as a composition gel using a composition dispensing tube.

At Step 308, game animals may be attracted to the wildlife feeder via positive aromatic characteristics imparted by the spice(s) in the composition.

At Step 310, feed scavenging and/or other varmint animals may be repelled and deterred from climbing the feeder legs of the wildlife feeder via negative gustatory characteristics imparted by the pepper(s) in the composition.

While certain illustrative embodiments of the disclosure have been described above, it will be recognized and understood that various modifications can be made to the embodiments and the appended claims are intended to cover all such modifications which may fall within the spirit and scope of the disclosure.

I claim:

1. A game attractant and varmint repellent composition for application at an object or area to attract game animals to the object or area via positive aromatic characteristics and simultaneously repel and deter feed scavenging animals from the object or area via negative gustatory characteristics, the game attractant and varmint repellent composition comprising:
   at least one surface;
   a composition mixture applied to the surface, the composition mixture comprising:
      at least one carrier in a quantity of from about 55% to about 95% by weight, the carrier rendering the composition mixture applicable to and spreadable on the surface;
      at least one pepper in a quantity of from about 0.5% to about 25% by weight;
      at least one oil in a quantity of from about 2% to about 25% by weight;
      at least one spice in a quantity of from about 2% to about 20% by weight; and
      deer urine; and
   whereby the composition mixture attracts the game animals to the surface via the positive aromatic characteristics and simultaneously repels and deters the feed scavenging animals from the surface via the negative gustatory characteristics.

2. The composition of claim 1, wherein the at least one carrier is jelly or butter.

3. The composition of claim 2, wherein the jelly comprises petroleum jelly.

4. The composition of claim 2, wherein the butter is shea butter, cocoa butter, mango butter, or any combination thereof.

5. The composition of claim 1, wherein the at least one pepper is cayenne pepper, black pepper, paprika, red pepper, tabasco pepper, serrano pepper, Thai pepper, jalapeno pepper, guajillo pepper, habanero pepper, or any combination thereof.

6. The composition of claim 1, wherein the at least one oil is oil derived from petroleum, olive oil, sunflower oil, coconut oil, canola oil, rice bran oil, sesame oil, vegetable oil, avocado oil, or any combination thereof.

7. The composition of claim 1, wherein the at least one spice is cinnamon, cinnamon extract, ginger, nutmeg, hazelnut, walnut, pecan, acorn, apple pie spice, allspice, cloves, pumpkin pie spice, cardamom, mace, star anise, cassia, or any combination thereof.

8. The composition of claim 1, wherein the deer urine is present in the composition mixture in a quantity of from about 1% by weight to about 50% b weight.

9. The composition of claim 1 wherein the composition mixture consist of the carrier comprising petroleum jelly in a quantity of from about 55% to about 85% by weight and paraffin wax in a quantity of from about 5% to about 25% by weight; the at least one pepper consists of cayenne pepper in a quantity of from about 0.5% to about 25% by weight; the at least one oil consists of olive oil in a quantity of from about 2% to about 25% by weight; and the at least one spice consists of cinnamon in a quantity of from about 1% to about 15% by weight and nutmeg in a quantity of from about 0.5% to about 5% by weight.

10. A game attractant and varmint repellent composition for application at an object or area to attract game animals to the object or area via positive aromatic characteristics and simultaneously repel and deter feed scavenging animals from the object or area via negative gustatory characteristics, the came attractant and varmint repellent composition consisting essentially of:
   at least one surface;
   a composition mixture applied to the surface, the composition mixture consisting essentially of:
      at least one carrier in a quantity of from about 60% to about 90% by weight, the carrier rendering the composition mixture applicable to and spreadable on the surface;
      at least one pepper in a quantity of from about 1% to about 20% by weight;
      at least one oil in a quantity of from about 5% to about 20% by weight;
      at least one spice in a quantity of from about 5% to about 15% by weight; and
      deer urine; and
   whereby the composition mixture attracts the came animals to the surface via the positive aromatic characteristics and simultaneously repels and deters the feed scavenging animals from the surface via the negative gustatory characteristics.

11. The composition of claim 10, wherein the at least one carrier is jelly or butter.

12. The composition of claim 11, wherein the jelly comprises petroleum jelly.

13. The composition of claim 11, wherein the butter is shea butter, cocoa butter, mango butter, or any combination thereof.

14. The composition of claim 10, wherein the at least one pepper is cayenne pepper, black pepper, paprika, red pepper, tabasco pepper, serrano pepper, Thai pepper, jalapeno pepper, guajillo pepper, habanero pepper, or any combination thereof.

15. The composition of claim 10, wherein the at least one oil is oil derived from petroleum, olive oil, sunflower oil, coconut oil, canola oil, rice bean oil, sesame oil, vegetable oil, avocado oil, or any combination thereof.

16. The composition of claim 10, wherein the at least one spice is cinnamon, cinnamon extract, ginger, nutmeg, hazelnut, walnut, pecan, acorn, apple pie spice, allspice, cloves, pumpkin pie spice, cardamom, mace, star anise, cassia, or any combination thereof.

17. A method of attracting game animals to and repelling varmint animals from an object or area by applying a game attractant and varmint repellent composition to at least one surface at the object or area to attract game animals to the object or area via positive aromatic characteristics and simultaneously repel and deter feed scavenging animals from the object or area via negative gustatory characteristics, the method comprising:
   obtaining a composition mixture comprising:
      at least one carrier in a quantity of from about 55% to about 95% by weight, the carrier rendering the composition mixture a pliable to and spreadable on the surface;
      at least one pepper in a quantity of from about 0.5% to about 25% by weight;
      at least one oil in a quantity of from about 2% to about 25% by weight;
      at least one spice in a quantity of from about 2% to about 20% by weight; and
      deer urine;

applying the composition mixture to the surface at the object or area;

attracting the game animals to the object or area via positive aromatic characteristics imparted by the at least one spice in the composition mixture; and repelling and deterring the varmint animals from the object or area via negative gustatory characteristics imparted by the at least one pepper in the composition mixture.

18. The method of claim 17 wherein obtaining the composition mixture comprises obtaining a roll-on composition dispenser having a dispenser base and a composition stick selectively extendable from the dispenser base, and applying the composition mixture to the object or area comprises applying the composition stick against the object or area.

19. The method of claim 17 wherein obtaining the composition mixture comprises obtaining a composition container and a composition gel selectively removable from the composition container, and applying the composition mixture to the object or area comprises removing the composition gel from the composition container and applying the composition gel on the object or area.

20. The method of claim 17 wherein obtaining the composition mixture comprises obtaining a composition tube and a composition gel selectively forcibly dischargeable from the composition tube, and applying the composition mixture to the object or area comprises forcibly discharging the composition gel from the composition tube onto the object or area.

* * * * *